United States Patent [19]

Vornberger

[11] 3,814,479
[45] June 4, 1974

[54] EXTRUDED DUMP TRAILER BODY
[75] Inventor: George F. Vornberger, Cincinnati, Ohio
[73] Assignee: Pullman Incorporated, Chicago, Ill.
[22] Filed: Nov. 20, 1972
[21] Appl. No.: 308,098

[52] U.S. Cl............ 298/23 M, 296/28 D, 298/17 R
[51] Int. Cl..... B62d 29/02, B62d 39/00, B60p 3/12
[58] Field of Search...... 298/17 R, 23 M; 296/28 D; 105/248; 29/482

[56] References Cited
UNITED STATES PATENTS

| | | | |
|---|---|---|---|
| 2,910,322 | 10/1959 | Magor | 296/28 D |
| 2,868,583 | 1/1959 | Harbers | 298/23 M |
| 3,003,601 | 10/1961 | Ott | 29/482 |
| 3,181,914 | 5/1965 | Humes | 298/17 R |
| 3,472,548 | 10/1969 | Comisac | 296/28 D |
| 3,572,252 | 3/1971 | Coover | 105/248 |
| 3,590,475 | 7/1971 | Geist | 29/482 |

FOREIGN PATENTS OR APPLICATIONS 149,470  12/1952  Australia......................... 298/23 M Primary Examiner—Robert S. Ward, Jr.
Assistant Examiner—Reinhard J. Eisenzopf
Attorney, Agent, or Firm—Hilmond O. Vogel

[57] ABSTRACT

A dump truck extruded body having a plurality of adjacent and interconnected extruded panels which extend continuously about the sides and floor portion of the dump truck body. The extruded panels include interlocking abutting seams to permit ease of attachment and also include integrally formed T-shaped strengthening flanges which extend the transverse length and height of each extruded panel.

10 Claims, 13 Drawing Figures

PATENTED JUN 4 1974 3,814,479
SHEET 1 OF 5
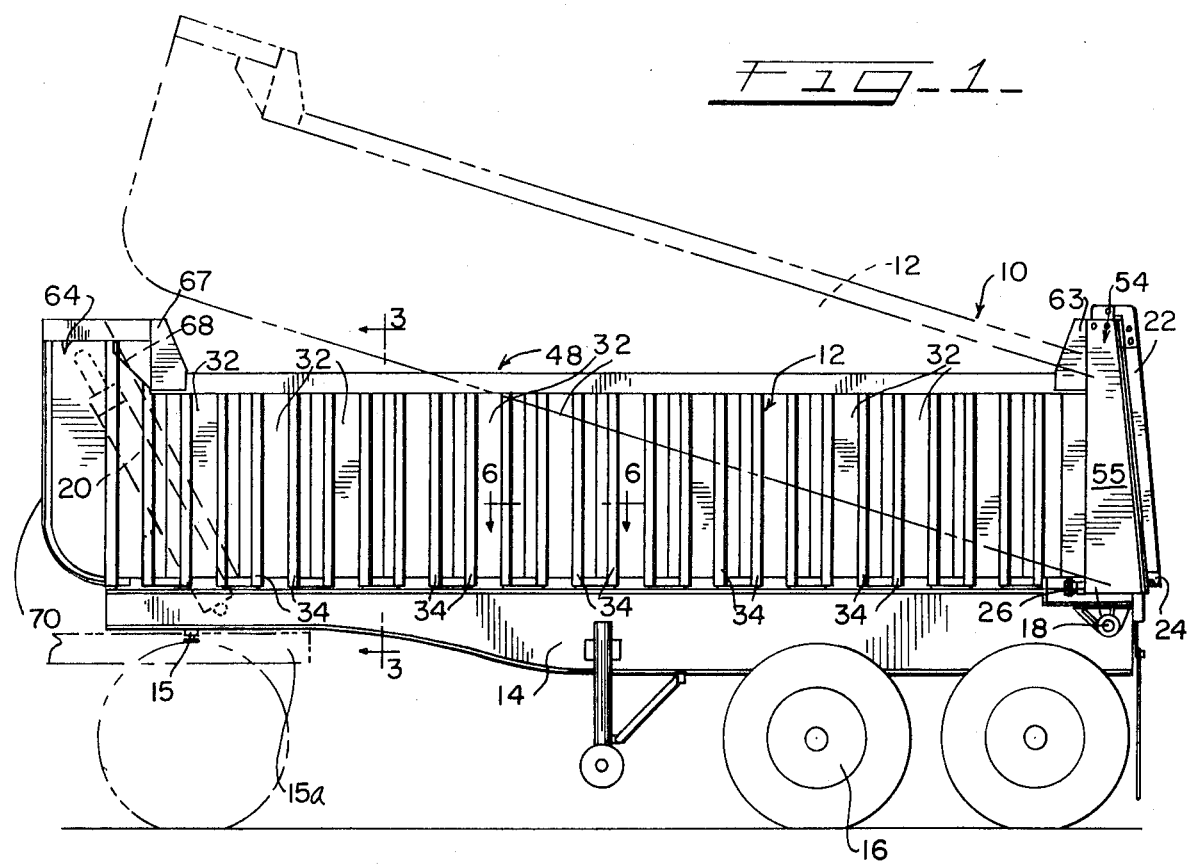
Fig-1-
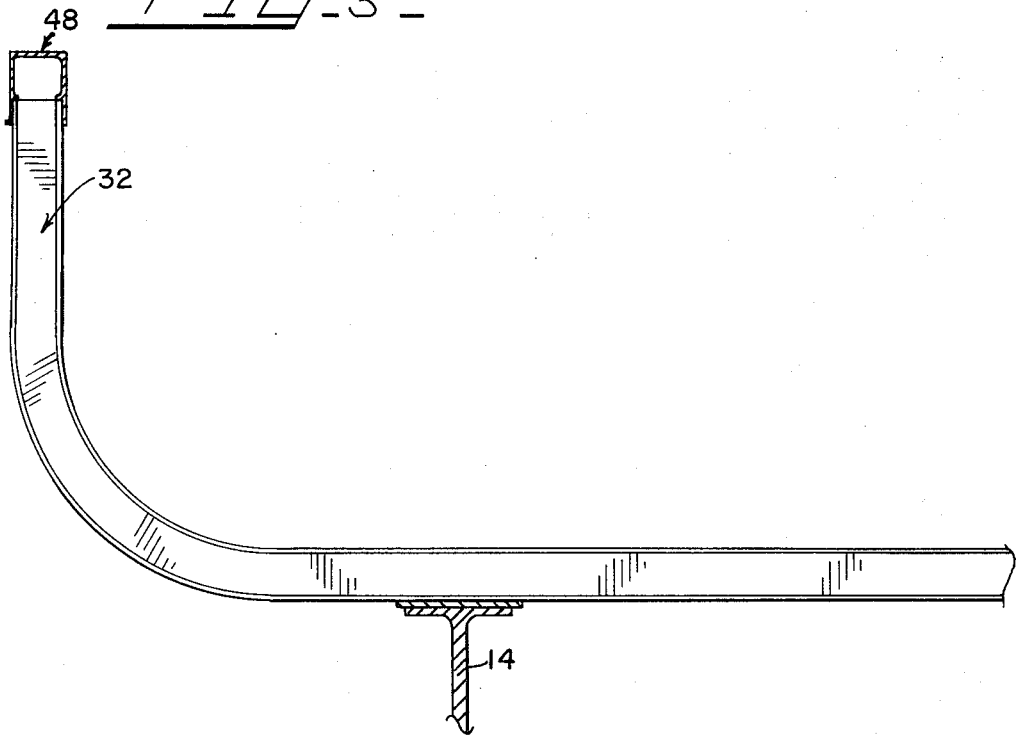
Fig-3-

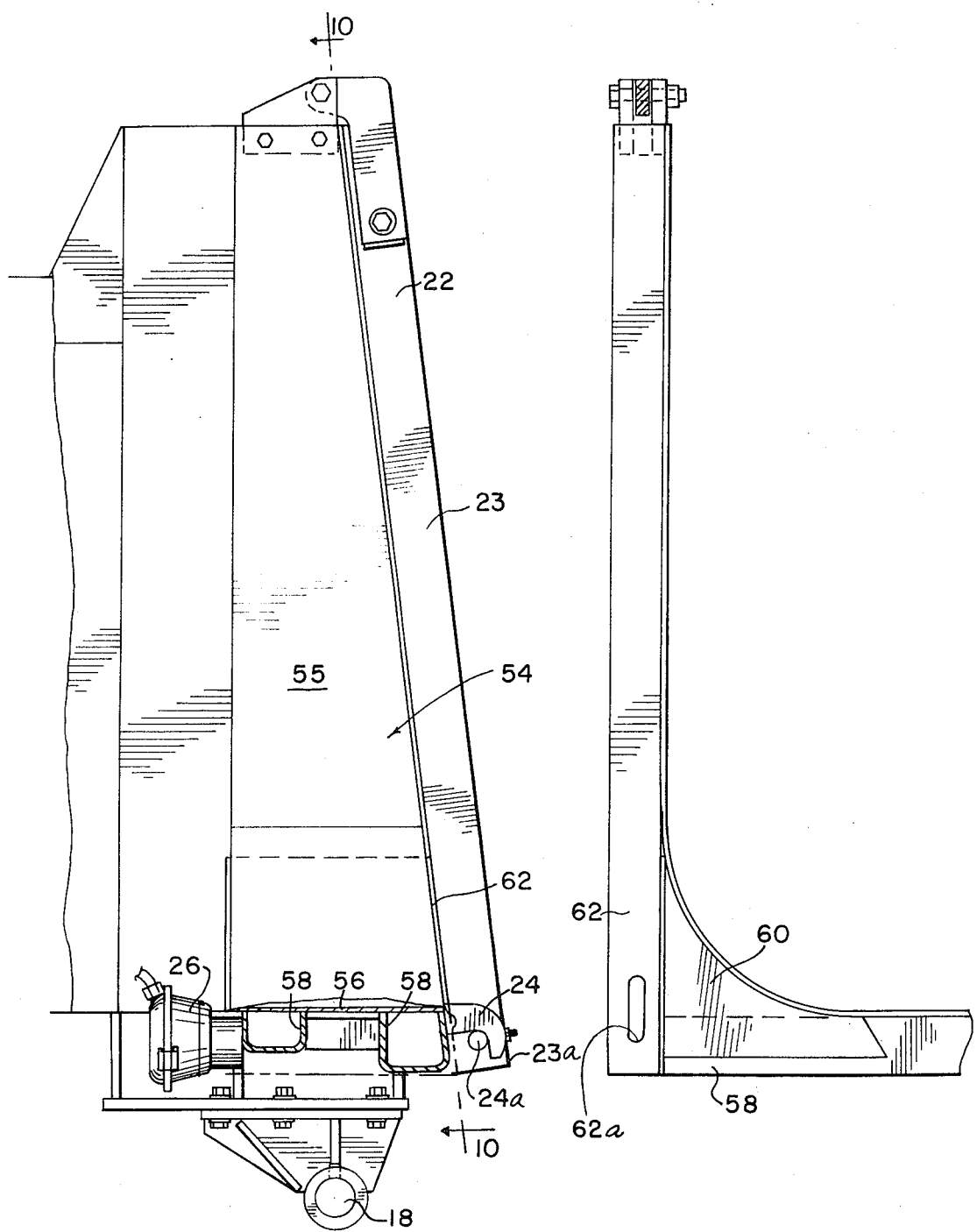

EXTRUDED DUMP TRAILER BODY

BACKGROUND OF THE INVENTION

1. Field of the Invention

This invention pertains to roadway truck vehicles having body portions made from extruded metal panels having integrally formed T-shaped strengthening flanges.

2. Description of the Prior Art

Prior art truck bodies generally are manufactured from independently constructed floor and side wall components which are welded together to form the one-piece truck body. A truck body manufactured of such a plurality of components which are welded together requires the use of extensive jigs and fixtures to align and hold the parts prior to welding together.

SUMMARY

This invention pertains to dump trucks having extruded bodies which are manufactured from a plurality of independently extruded body panel portions which are curved upward to form integral side and floor portions for the truck. A plurality of extruded panels are positioned adjacent each other and include mating seam sections which facilitate welding the panels together. A top chord or side plate member is positioned atop each of the side wall portions of the extrusion and rigidifies the top portions of the side wall to prevent outward bulging. The truck chassis includes a front body hold down lock and is in a pneumatic circuit with the gate release locks of the tilting truck body, or the front body hold down lock can have its own pneumatic release circuit.

It is an object of the present invention to provide a truck body comprising a plurality of extruded transversely continuous panel portions which form the side walls and floor unit.

Another object of the present invention is to provide a truck body which may be easily repaired should damage occur to a panel portion by easily and rapidly removing the damaged panel without the need of replacing or repairing the entire wall section.

It is yet another object of the present invention to provide a tilting truck body having reinforced front and rear body portions made from extruded panels and having integrally formed T-shaped strengthening flanges.

These and other objects of the invention will become apparent from reference to the following description, attached drawings and appended claims.

BRIEF DESCRIPTION OF THE DRAWINGS

FIG. 1 is a side elevational view of the truck of the present invention;

FIG. 3 is a cross sectional view taken along lines 3—3 of FIG. 1;

FIG. 9 is a side and enlarged view of the swinging discharge gate used with the present invention;

FIG. 10 is a view taken generally along lines 10—10 of FIG. 9;

DESCRIPTION OF THE PREFERRED EMBODIMENT

Figure 2:
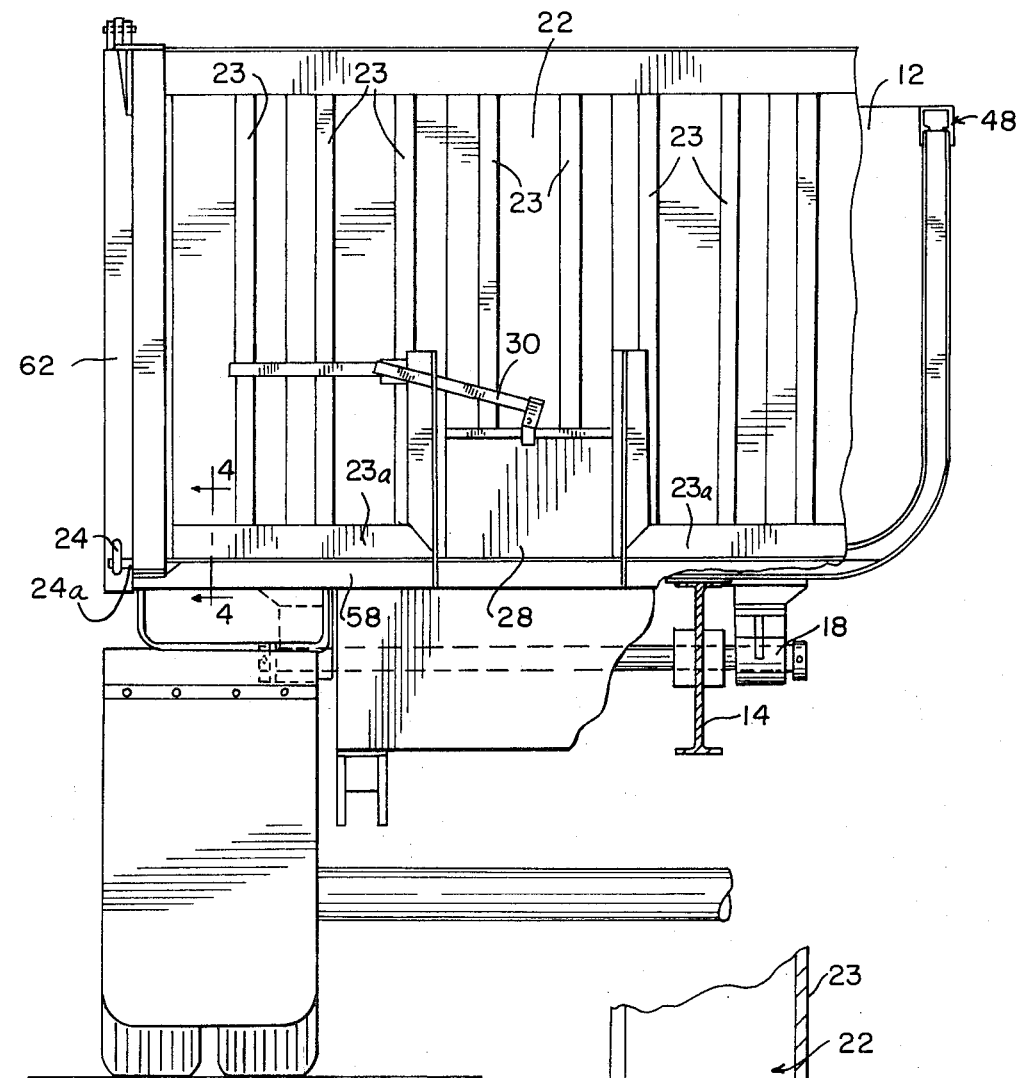
FIG. 2 is an end view of the truck illustrated in FIG. 1.
Figure 4:
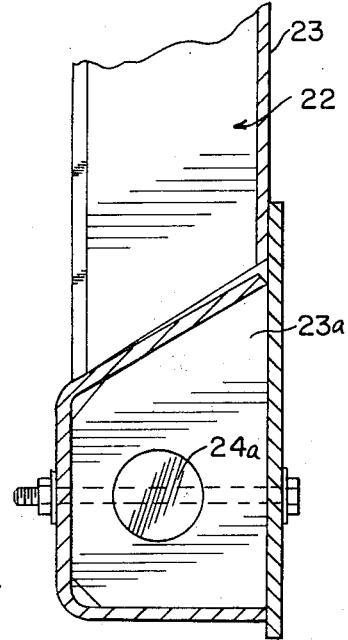
FIG. 4 is a removed sectional view taken along lines 4—4 of FIG. 2.
Figure 5:
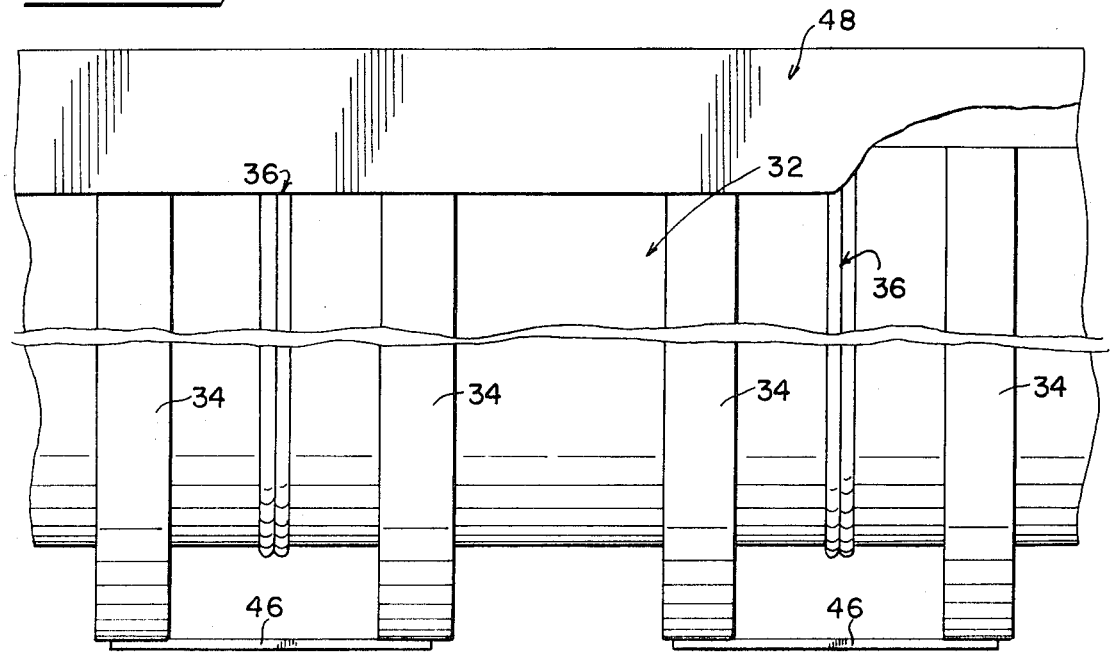
FIG. 5 is a view of the vehicle side wall area with portions removed for the purpose of showing the top rail and connecting support plate members in position.
Figure 6:
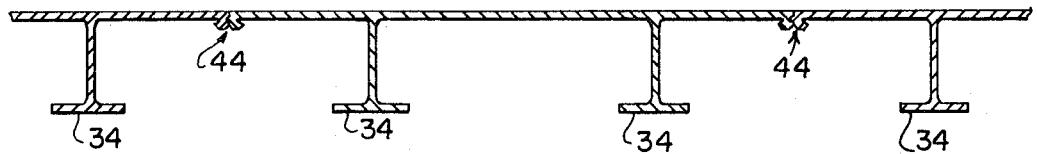
FIG. 6 is a sectional view taken generally along lines 6—6 of FIG. 1.

With reference now to the drawings and in particularly to FIG. 1, there is shown a dump truck 10 of the present invention which includes the usual tilting body portion 12. A supporting underframe or chassis is designated by the numeral 14 and includes the tractor engaging kingpin 15 to permit attachment to a powered tractor unit which is shown in phantom and designated by the numeral 15a. The chassis is resiliently supported on a running gear assembly designated by the numeral 16. A truck body pivot or hinge shaft 18 pivotally attaches the truck body 12 to the underframe 14. Vehicle emptying occurs when a hydraulic lift cylinder 20 is actuated to thereby pivot the tilting body 12 about the pivot 18. The end portion of the dump truck 10 is closed off by a pivoting rotatable tail gate 22 which includes an extruded panel section having a plurality of T-shaped reinforcing ribs 23 extending outwardly of the vehicle. As noticed in FIG. 2, gate 23 has a reinforcing bottom beam portion 23a which is grasped by a gate locking hook arm 24 which engages a locking bolt 24a which is fixedly mounted at each end of the reinforced bottom portion 23a. Pneumatic operating cylinders 26 are mounted adjacent and interconnected to each locking arm 24 to provide for selective locking and unlocking of the tail gate 22 upon actuation of suitable air valving. The lower central portion of the gate 23 includes a vertically reciprocal sliding gate 28 which is movable in response to actuation of the operating handle assembly 30.

Figure 8:
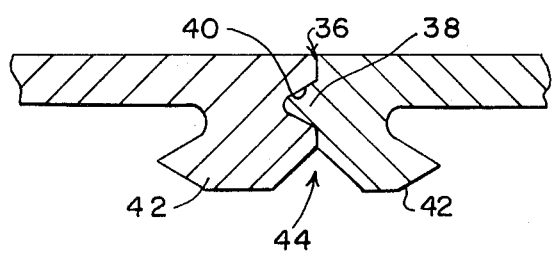
FIG. 8 is an enlarged cross sectional view of the mating seam portions of adjacent panel extrusions.

The main body of the dump truck 10 is manufactured from a plurality of extruded aluminum alloy panels 32, which provide a U-shaped trailer cross section having rounded inside corners which provide for easy cleanout of the dump trailer. These panels include integrally formed T-shaped reinforcing ribs 34 and have at their edge portions a contoured seam 36 which provides for insertion in the mating seam of an adjacent panel to facilitate welding the panels together. As illustrated in FIG. 8, each extruded panel includes one edge 38 protruding from the panel and a second notched edge 40. In assembling the truck body panels the protruding portion 38 is inserted into the depression 40 of an adjacent panel and a weld groove 44 is also formed, thus providing a V-shaped receptacle for filler metal used in welding the panels 32 together. Rib connecting support plates 46 interconnect the adjacent reinforcing ribs 34 of mating extruded panels 32 to form additional support and reinforcement for the truck body.

Figure 7:
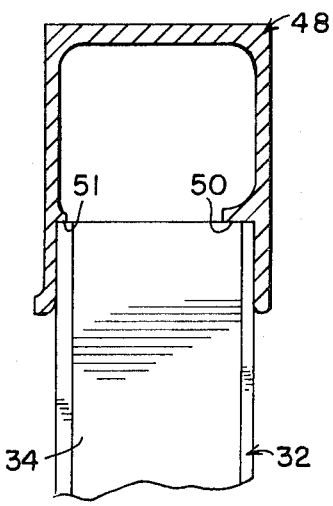
FIG. 7 is a cross sectional view of the top rail positioned atop each side wall portion.

The top portions of each of the side wall sections of the extruded panels 32 receive an extruded top rail cap plate 48 which is shown enlarged in FIG. 7. This top rail or cap plate 48 is fitted over the top ends of the extruded panels 32 until the stops 50, 51 engage the extruded panel. The top rail 48 is then welded onto the panels 32 to thereby form a reinforced top side wall portion which resists bulging of the side wall units.

The tail gate end of the truck body 12 includes a body end transition section 54 which includes a wedge shaped plate 55 extending upwardly from a floor extension plate member 56 (see FIGS. 9-10). Attached to the underside of the plate 56 are a pair of transversely extending reinforced cross support members 58. A corner reinforcing gusset plate 60 reinforces the corner which is formed between the side wedge section 55 and the floor extension 56. A side end plate 62 extends transversely and vertically along the end edge portion of the wedge shaped plate 55 and includes a slot 62a which the lock arm 24 extends through to engage the locking bolt 24a. A second reinforcing gusset 63 extends between the body transition end section 54 and the top rail 48 to strengthen the car body at this highly stressed corner. This transition section 54 disposes the tail gate 22 on an incline when in a closed position whereby the gate 22 is urged closed by gravity and the locking bolts are placed in position to be grasped by the gate hook arm 24.

The dump truck 10 includes a reinforced front section designated generally by the numeral 64. A reinforcing gusset plate 67 analogous to the plate 63 is positioned at the corner between the top rail 48 and the body front section 64. An inclined slope sheet 68 extends from the top of the body front section 64 downwardly and inwardly into the truck body and terminates at the floor portion. The front portion of the body front section 64 also includes the T-shaped reinforcing extruded flanges 70 as is present in the extruded side panels 32.

Now referring to FIGS. 11-13 the front body hold down unit will be described. A chassis attached bracket 74 mounts the hold down assembly 72. A pneumatic operating chamber 75 is mounted on this bracket 74 and includes a reciprocable rod 76 with an end portion having the connecting yoke 77 fixedly attached thereto. The yoke 77 has a pin connection for attaching the operating chamber 75 to the pivoted locking arm 78. Pivot bracket 78a mounts the locking arm 78 to the chassis bracket 74. The locking arm 78 includes a bar nose portion 79 which extends upward from the chassis and is positioned to engage a wear plate 80 of the dump body 12. Operation of the pneumatic operating chamber 75 moves the chamber rod longitudinally to the left as illustrated in FIG. 12 and when the air pressure is removed the biasing force of the return spring 81 returns the locking arm 78 to the position illustrated in FIG. 12. This body hold down assembly 72 provides a safety means holding down the tilting dump body 12 when subject to inertial bumping forces.

Figure 11:
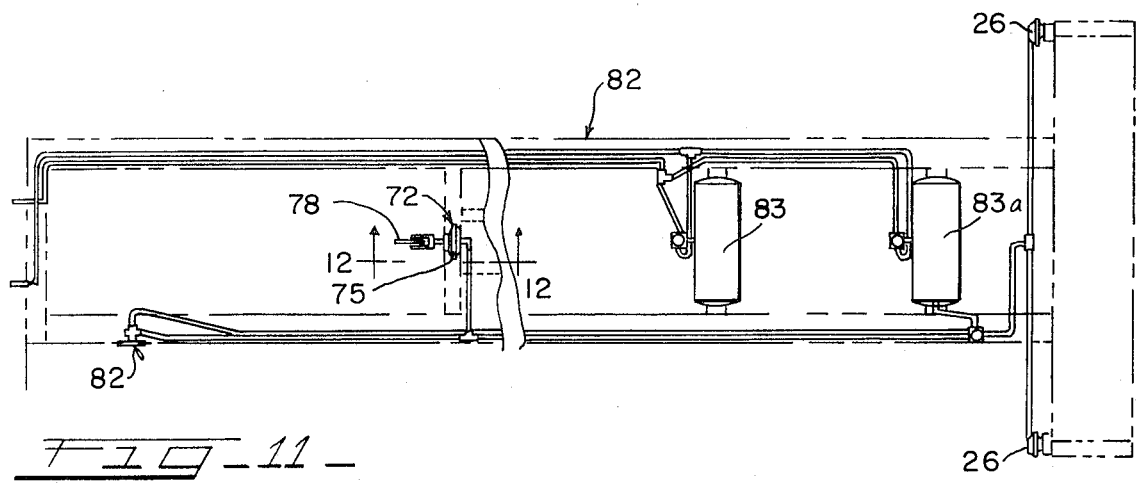
FIG. 11 is a top plan view of the pneumatic lines used in conjunction with the locking equipment on the truck body.
Figures 12, 13:
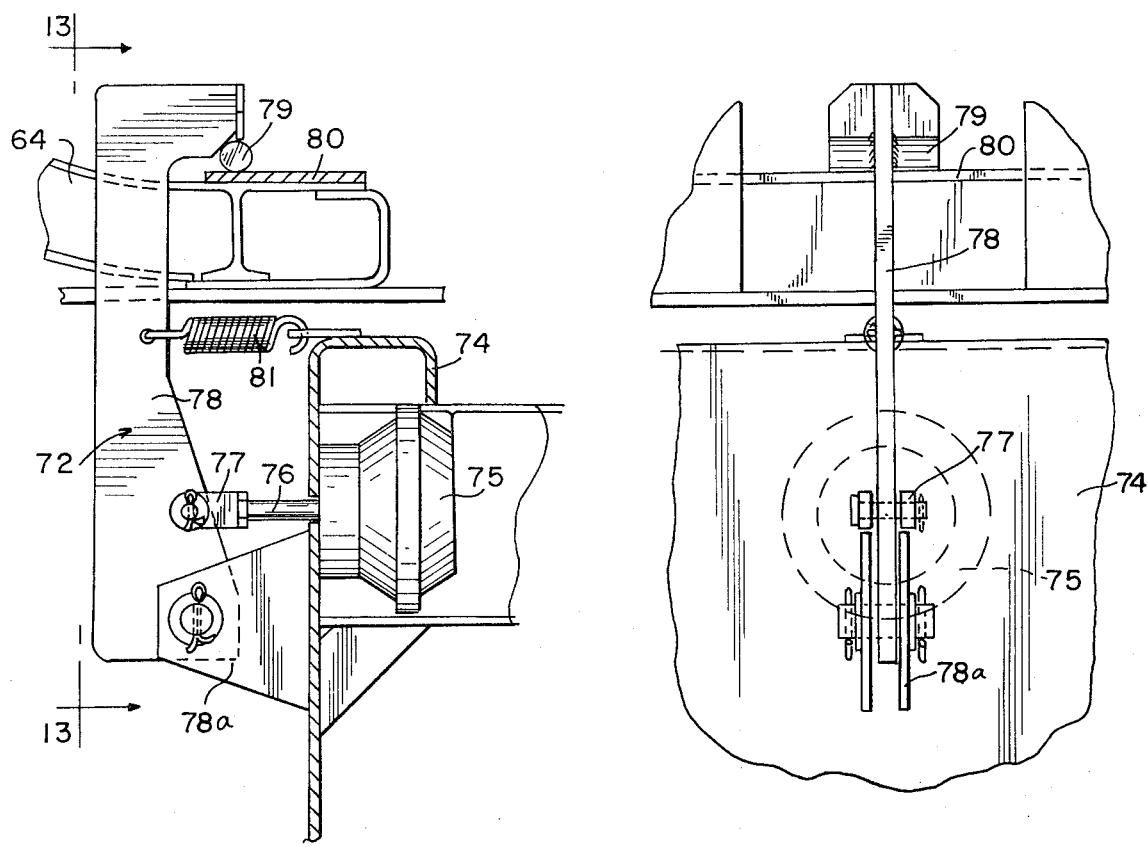
FIG. 12 is an enlarged view of the front body hold down and locking unit.
FIG. 13 is a view taken generally along lines 13—13 of FIG. 12.

The pneumatic piping or conduit assembly is illustrated in FIG. 11 and shows an operating valve lever 82 which is connected with both the tail gate locks 26 and with the operating chamber 75 to permit simultaneous unlocking of the tilting body and unlocking of the tail gate 22. Receiver tanks 83, 83a maintain system pressure when surge loads are applied to the pneumatic circuit and are charged by a compressor carried on the tractor and which is hooked in through the truck body hoses and fittings 84.

Thus it is noticed that the extruded body construction of the present invention provides a novel means of fabricating a truck tilting body whereby the length may be easily varied by adding or deleting extruded panels. The interlock provides a secure and easily fabricated welded connection and also permits easy removal of damaged panels should a replacement be required rather than replacing the entire side wall or patching the unit.

The foregoing description and drawings merely explain and illustrate the invention and the invention is not limited thereto, except insofar as the appended claims are so limited, as those skilled in the art who have the disclosure before them will be able to make modifications and variations therein without departing from the scope of the invention.

What is claimed is:

1. A dump trailer body comprising:
   a plurality of adjacently positioned extruded panels forming sides and a bottom of the trailer body;
   said extruded panels being continuous members defining an open top truck body;
   each extruded panel having an opposed pair of edges providing for mating seam connections between adjacent extruded panels;
   each extruded panel comprising a flat body portion and having a pair of spaced apart integrally formed reinforcing ribs extending outwardly therefrom;
   each of said reinforcing ribs including a web portion extending outwardly from an extruded panel adjacent a respective one of the opposed pair of edges and having a strengthening flange positioned perpendicularly therefrom to define a generally T-shaped reinforcing rib extending continuously about the sides and bottom of the dump trailer body;
   each extruded panel having end sections forming upwardly facing tops of the trailer body sides;
   top rail means attached to the top of each extruded panel end section thereby forming reinforced sides; and
   a plurality of support plates disposed in longitudinal alignment beneath said extruded panels in an intermittent array;
   each of said support plates having a length with ends thereof fixedly attached to respective reinforcing ribs on adjacent extruded panels to shunt a respective seam connection.

2. The invention according to claim 1, and:
   said extruded panels forming the continuous side and bottom of the dump trailer body being extruded from aluminum alloy.

3. The invention according to claim 1, and:
   said extruded panels comprising side wall portions and a bottom wall portion with the side wall portions being bent normally upwardly of the bottom wall portion and forming rounded internal corners in said dump trailer body to thereby provide for ease of clean out.

4. The invention according to claim 1, and:
   said trailer body having an end transition section and a pivoting tail gate mounted thereon;
   said transition section providing an inclined tail gate frame thereby disposing the tail gate in a gravity induced closed inclined position flush on said frame;

a locking hook mounted adjacent the transition section and engageable with said tail gate when said gate is disposed in the closed inclined position on said tail gate frame to securely lock the gate closed.

5. The invention according to claim 1, and:
said trailer body pivotally mounted on a supporting chassis;
a trailer body hold down locking unit attached to said supporting chassis and selectively engageable to lock and unlock the pivotable trailer body to said chassis;
said locking unit having a pivoting locking arm connecting the pivoting trailer body to said chassis and being operatively connected to a pneumatic operating means.

6. The invention according to claim 1 and:
said top rail means comprising an extruded cap plate having a top wall, a pair of side walls depending from said top wall, and a pair of stop means spaced from the top wall and extending inward from each of said pair of side walls, respectively, for spacing the top wall of said extruded cap plate from said end sections forming the upwardly facing tops of the trailer body sides.

7. The invention according to claim 1, and:
each extruded panel having first and second contoured edges providing for mating seam connection of the adjacent panels and further said first contoured edge having a protruding seam portion and said second contoured edge having a receiving groove and said protruding edge insertable in the receiving groove of an adjacent extruded panel to thereby align the adjacent panels.

8. The invention according to claim 7, and:
said first and said second mating edges of each extruded panel having an inclined seam portion extending outwardly of the extruded panel and combining with an associated inclined seam of adjacent panels to thereby form weld grooves for placement of attaching weld filler metal.

9. The invention according to claim 1, and:
said dump trailer body having a reinforced front portion comprising and extruded panel construction and said front portion having a reinforced housing unit for a hydraulic lift cylinder.

10. The invention according to claim 9, and:
said extruded panel construction of the front section having a plurality of stiffener flange elements extending vertically thereon and having a generally T-shaped cross section positioned exterior of the vehicle;
said front section having a top portion extending above the top rail means of each trailer body side.

* * * * *